United States Patent
Liu

(10) Patent No.: US 11,961,488 B2
(45) Date of Patent: Apr. 16, 2024

(54) METHOD AND DEVICE FOR CONTROLLING SCREEN OF ELECTRONIC DEVICE, RELATED ELECTRONIC DEVICE AND STORAGE MEDIUM

(71) Applicant: BEIJING XIAOMI MOBILE SOFTWARE CO., LTD., Beijing (CN)

(72) Inventor: Hao Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 41 days.

(21) Appl. No.: 17/877,600

(22) Filed: Jul. 29, 2022

(65) Prior Publication Data

US 2023/0252950 A1 Aug. 10, 2023

(30) Foreign Application Priority Data

Feb. 7, 2022 (CN) .......................... 202210116826.9

(51) Int. Cl.
*G09G 3/36* (2006.01)
*G09G 5/00* (2006.01)

(52) U.S. Cl.
CPC .......... *G09G 3/3648* (2013.01); *G09G 5/006* (2013.01); *G09G 2330/021* (2013.01); *G09G 2354/00* (2013.01)

(58) Field of Classification Search
CPC ............... G09G 3/3648; G09G 5/006; G09G 2330/021; G09G 2354/00; G09G 3/2096; G09G 5/10; G09G 5/30; G09G 2320/0247; G09G 2320/0626; G09G 2320/103; G09G 2340/0435; G09G 2360/16; G09G 2370/04; Y02D 30/70
See application file for complete search history.

(56) References Cited

U.S. PATENT DOCUMENTS

| | | | |
|---|---|---|---|
| 10,600,388 B1 | 3/2020 | Pais et al. | |
| 2018/0033360 A1* | 2/2018 | Bae | G09G 3/2096 |
| 2018/0240260 A1* | 8/2018 | Lee | G06F 3/0481 |
| 2020/0401298 A1* | 12/2020 | Lu | G06F 3/04842 |
| 2022/0013053 A1* | 1/2022 | Kim | H02M 1/084 |
| 2023/0326393 A1* | 10/2023 | Huang | G09G 3/293 345/55 |

FOREIGN PATENT DOCUMENTS

WO WO 2021157950 A1 8/2021

OTHER PUBLICATIONS

European Patent Application No. 22187847.3, Search and Opinion dated May 12, 2023, 15 pages.

* cited by examiner

*Primary Examiner* — Hong Zhou
(74) *Attorney, Agent, or Firm* — COZEN O'CONNOR

(57) ABSTRACT

A method for controlling a screen of an electronic device includes the following. A switching instruction sent by an application layer is received. The switching instruction is configured to control a display chip to switch between an AOD state and a non-AOD state. In response to the switching instruction, it is determined whether a first display interface received from the application layer at a current moment matches the switching instruction. In response to determining that the first display interface matches the switching instruction, the display chip switches between the AOD state and the non-AOD state based on the switching instruction to display the first display interface.

17 Claims, 7 Drawing Sheets

METHOD AND DEVICE FOR CONTROLLING SCREEN OF ELECTRONIC DEVICE, RELATED ELECTRONIC DEVICE AND STORAGE MEDIUM

CROSS REFERENCE TO RELATED APPLICATION

The disclosure claims the benefit of priority to Chinese Patent Application No. 202210116826.9, filed on Feb. 7, 2022, the content of which is incorporated herein by reference in its entirety for all purposes.

BACKGROUND

AOD (Always On Display) is a display mode of electronic devices such as mobile phones, tablets, and computers. When an electronic device is in an AOD state, the screen of the electronic device is locked, but a part of the screen can remain on for a long time to display information such as time and/or notifications. Users can see the current time information, the electric quantity information, the date information, and other information without activating the display interface. Therefore, the user satisfaction can be improved.

SUMMARY

The disclosure relates to a field of terminal technologies, and more particularly, to a method and a device for controlling a screen of an electronic device, a related electronic device, and a storage medium.

A first aspect of embodiment of the disclosure provides a method for controlling a screen of an electronic device. The method includes:
  receiving a switching instruction sent by an application layer, in which the switching instruction is configured to control a display chip to switch between an always on display (AOD) state and a non AOD state;
  in response to the switching instruction, determining whether a first display interface received from the application layer at a current moment matches the switching instruction;
  in response to determining that the first display interface matches the switching instruction, controlling the display chip to switch a display state based on the switching instruction, to display the first display interface.

A second aspect of embodiments of the disclosure provides an electronic device. The electronic device includes:
  a processor;
  a memory, storing instructions executable by the processor; in which the processor is configured to call and execute the instructions stored in the memory, to perform the method for controlling a screen of an electronic device according to the first aspect of embodiments of the disclosure.

A third aspect of embodiments of the disclosure provides a non-transitory computer-readable storage medium, having a computer program stored thereon. When the program is executed by a processor, a method for controlling a screen of an electronic device according to the first aspect of embodiments of the disclosure is performed.

Additional aspects and advantages of the disclosure will be set forth, in part, from the following description, and in part will be apparent from the following description, or may be learned by practice of the disclosure.

BRIEF DESCRIPTION OF THE DRAWINGS

The above and/or additional aspects and advantages of the disclosure will become apparent and readily understood from the following description of embodiments taken in conjunction with the accompanying drawings.

DETAILED DESCRIPTION

Figure 1:
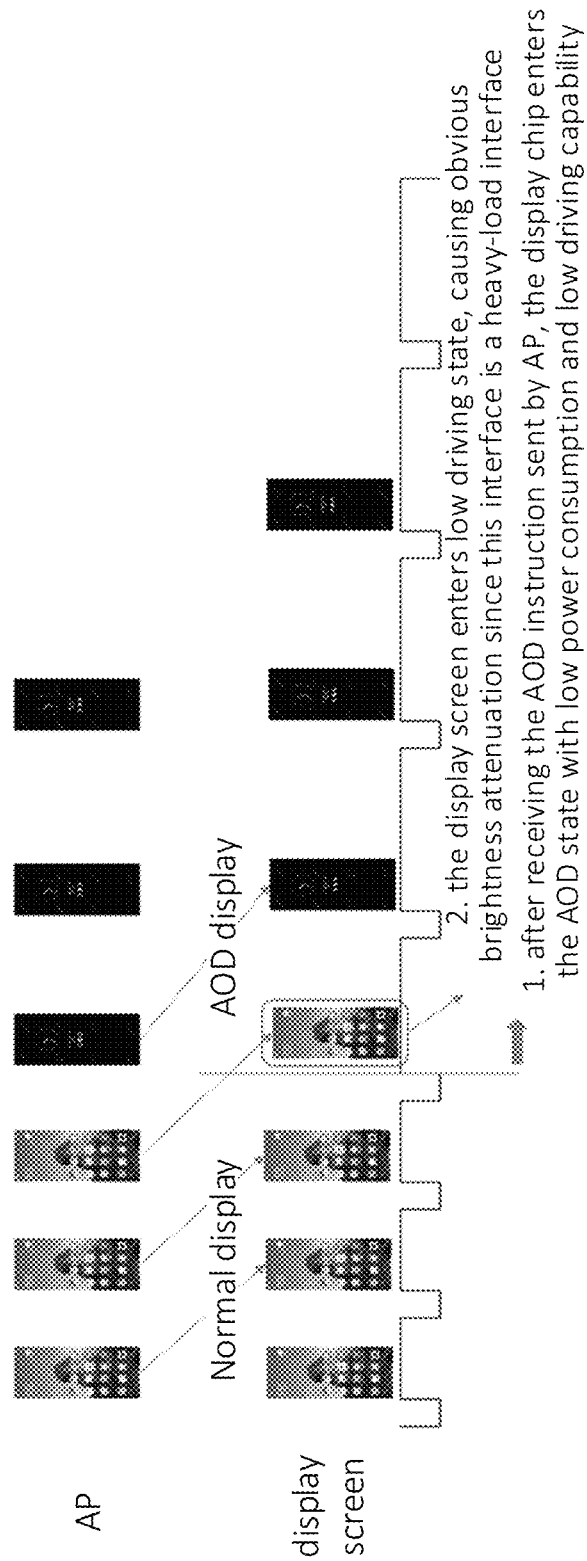
FIG. 1 is a schematic diagram illustrating the interface demonstration of the related art.

Embodiments of the disclosure are described in detail below, examples of which are illustrated in the accompanying drawings, where the same or similar reference numerals refer to the same or similar elements or elements having the same or similar functions throughout. The embodiments described below with reference to the accompanying drawings are examples, and are intended to explain the disclosure and should not be construed as a limitation of the disclosure.

Generally speaking, for an electronic device with an Active Matrix/Organic Light Emitting Diode (AMOLED) display screen, an Always On Display (AOD) function can be activated to improve user satisfaction and meet the individual demands. However, at present, when the electronic device enters or exits the AOD function, the display screen will flicker. The reason why the display screen flickers is the mismatch between the display interface and the AOD instruction sent by an application platform (AP, which is an application system or an application layer) when the AP refreshes the display interface. In some examples, the term "display interface" refers to a page displayed by the display screen, such as graphical user interface (GUI).

For example, after the display chip, e.g., a display driver integrated circuit (DDIC), receives an AOD instruction sent by the AP and enters an AOD state of low power consumption and low driving capability, if the AP of the electronic device does not send an AOD interface to the DDIC yet, at this time, the display chip of the electronic device displays a normal operation interface, e.g., a user interface (UI). However, since the display interface is a heavy-load interface compared to the off-screen interface, the display screen in the AOD state will have obvious brightness attenuation, which brings the intuitive feeling to the user using the electronic device is brightness flickering. Similarly, when the electronic device switches from the AOD state to the normal operation interface, the display screen will also flicker. It is understandable, sending the AOD interface refers to sending an indication of the AOD interface or sending information of the AOD interface (such as AOD interface rendering data).

In detail, as illustrated in FIG. 1, the related art may include the following two aspects.
1. After receiving the AOD instruction sent by the AP, the display chip enters the AOD state with low power consumption and low driving capability.
2. The interface sent by the AP to the display chip at the current moment is the normal operation interface, which causes that the display screen in the AOD state of low driving capability has obvious brightness attenuation since this interface is a heavy-load interface compared to the AOD interface.

Therefore, in view of the above existing problems, the disclosure provides a method and a device for controlling a screen of an electronic device, a related electronic device, and a related non-transitory computer-readable storage medium.

The method and the device for controlling a screen of an electronic device, the electronic device, and the storage medium in accordance with embodiments of the disclosure will be described below with reference to the accompanying drawings. It is understandable that, the method can be performed by the display chip, e.g., the DDIC, in the electronic device throughout the disclosure, unless otherwise limited.

Figure 2:
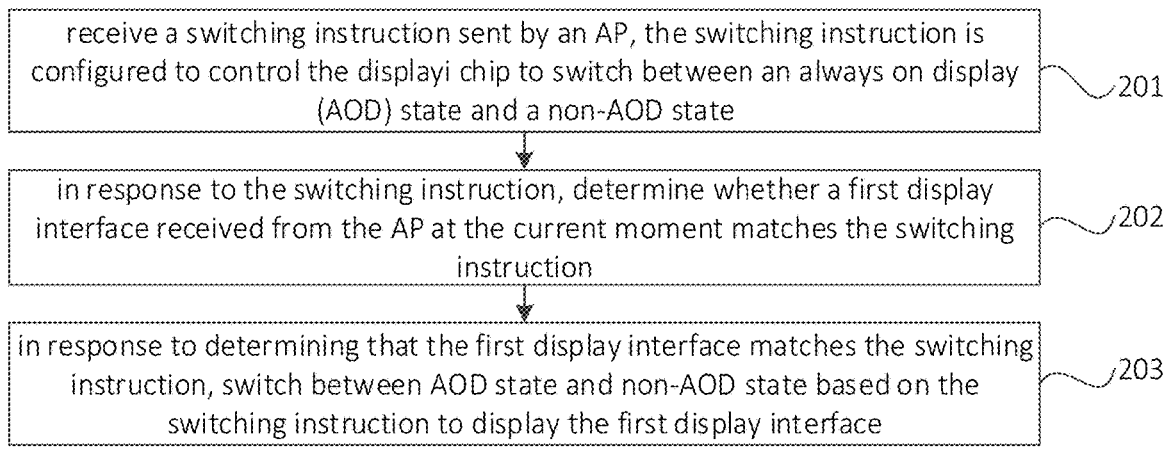
FIG. 2 is a flowchart illustrating a method for controlling a screen of an electronic device in accordance with an embodiment of the disclosure.

FIG. 2 is a flowchart illustrating a method for controlling a screen of an electronic device in accordance with an embodiment of the disclosure.

For example, the method for controlling a screen of an electronic device is executed by a device for controlling a screen of an electronic device. The device may be the display chip, e.g., the DDIC. The device can be integrated into an electronic device, such that the electronic device can execute functions of controlling a screen of an electronic device.

The electronic device may be any device with computing capabilities, such as a personal computer (PC) or a mobile terminal. The mobile terminal can be, for example, a mobile phone, a tablet computer, a personal digital assistant, a wearable device and other hardware devices with various operating systems, touch screens and/or display screens.

As illustrated in FIG. 2, the method for controlling a screen of an electronic device may include the following.

At block 201, a switching instruction sent by an application layer is received. The switching instruction is configured to control a display chip to switch between an always on display (AOD) state and a non-AOD state.

In some implementations, the electronic device may receive the switching instruction sent by the application layer.

The execution subject of the method can be the display chip of the electronic device. The application layer can send the switching instruction to the display chip, and correspondingly, the display chip can receive the switching instruction sent by the application layer. The switching instruction can be configured to control the display chip to switch between an AOD state and a non-AOD state.

At block 202, in response to the switching instruction, it is determined whether a first display interface received from the application layer at a current moment matches the switching instruction. Receiving the first display interface refers to receiving an indication of the first display interface, or receiving information of the first display interface, such as the first display interface rendering data or the like.

In some implementations, the first display interface may be an AOD interface, or a non-AOD interface, e.g., a normal operation interface (which is a UI interface).

In some implementations, the current moment may be a moment when responding to the switching instruction, or a moment when receiving the switching instruction sent by the application layer, or a moment when receiving the display interface sent by the application layer for the first time after responding to the switching instruction, or a moment when receiving the display interface sent by the application layer for the first time after receiving the switching instruction.

In some implementations, after receiving the switching instruction, the electronic device can respond to the switching instruction to determine whether the display interface received from the application layer at the current moment (i.e., the first display interface) matches the switching instruction.

For example, the execution subject of the method is the display chip of the electronic device. After receiving the switching instruction sent by the application layer, the display chip can respond to the switching instruction to determine whether the first display interface received from the application layer at the current moment matches the switching instruction to determine whether the first interface matches the switching instruction.

At block 203, in response to determining that the first display interface matches the switching instruction, the display chip switches between the AOD state and the non-AOD state according to the switching instruction to display the first display interface.

In some implementations, in the case that the first display interface received from the application layer at the current moment matches the switching instruction, the display chip can switch its state according to the switching instruction. After the display chip switches its state, the first display interface is displayed.

As an example, in the case that the switching instruction is configured to control the display chip to switch to the AOD state, when the first display interface received by the application layer at the current moment matches the switching instruction, the display chip can switch to the AOD state. After the display chip is switched to the AOD state, the first display interface can be displayed.

As another example, in the case that the switching instruction is configured to control the display chip to switch to the non-AOD state, when the first display interface received from the application layer at the current moment matches the switching instruction, the display chip can switch to the non-AOD state. After the display chip is switched to the non-AOD state, the first display interface can be displayed.

With the method for controlling a screen of an electronic device in accordance with embodiments of the disclosure, the switching instruction sent by the application layer is received. The switching instruction is configured to control the display chip to switch between the AOD state and the non-AOD state. In response to the switching instruction, it is determined whether the first display interface received from the application layer at the current moment matches the switching instruction. In response to determining that the first display interface matches the switching instruction, the display chip switches between the AOD state and the non-AOD state according to the switching instruction to display the first display interface. Therefore, when the display interface issued by the application layer matches the switching instruction, the display chip performs state switching according to the switching instruction, and the display interface is displayed after the display chip performs the state switching, which can avoid that the display screen flickers when the display interface performs the state switching in case that the display interface does not match the switching instruction. Therefore, the user experience is improved.

In the case that the switching instruction is configured to control the display chip to switch to the AOD state, in order to clearly explain how the disclosure determines whether the first display interface received from the application layer at the current moment matches the switching instruction, the disclosure further provides a method for controlling a screen of an electronic device.

Figure 3:
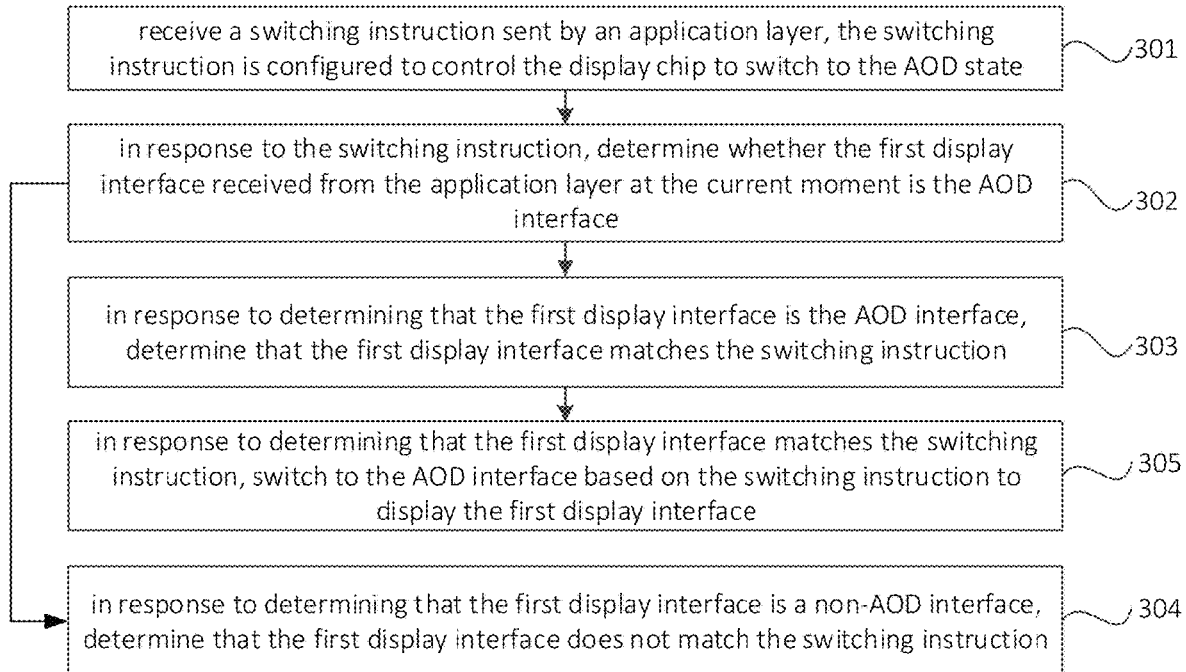
FIG. 3 is a flowchart illustrating a method for controlling a screen of an electronic device in accordance with another embodiment of the disclosure.

FIG. 3 is a flowchart illustrating a method for controlling a screen of an electronic device in accordance with an embodiment of the disclosure.

As illustrated in FIG. 3, the method for controlling a screen of an electronic device includes the following.

At block 301, a switching instruction sent by an application layer is received. The switching instruction is configured to control the display chip to switch to an AOD state.

In some implementations, the electronic device may receive the switching instruction sent by the application layer.

For example, the execution subject of the method is a display chip of an electronic device. The application layer can send the switching instruction to the display chip, and correspondingly, the display chip can receive the switching instruction sent by the application layer. The switching instruction can be configured to control the display chip to switch to the AOD state.

At block 302, in response to the switching instruction, it is determined whether the first display interface received from the application layer at the current moment is an AOD interface.

In some implementations, in the case that the switching instruction is configured to control the display chip to switch to the AOD state, after receiving the switching instruction, it can be determined whether the first display interface received from the application layer at the current moment is an AOD interface.

In some implementations, when the first display interface is the AOD interface, a block 303 is performed. When the first display interface is a non-AOD interface, a block 304 is performed.

At block 303, in the case that the first display interface is the AOD interface, it is determined that the first display interface matches the switching instruction.

In some implementations, when the switching instruction is configured to control the display chip to switch to the AOD state and the first display interface received at the current moment is the AOD interface, it is determined that the first display interface matches the switching instruction.

At block 304, in the case that the first display interface is a non-AOD interface, it is determined that the first display interface does not match the switching instruction.

In some implementations, when the switching instruction is configured to control the display chip to switch to the AOD state and the first display interface received at the current moment is the non-AOD interface, it can be determined that the first display interface does not match the switching instruction.

It is to be noted that when the switching instruction is configured to control the display chip to switch to the AOD state and the first display interface received at the current moment is the non-AOD interface, that is when the first display interface does not match the switching instruction, the display chip may enter a waiting state and perform the block 302 and subsequent blocks again after receiving a new first display interface from the application layer at any time after the current moment.

Figure 4:
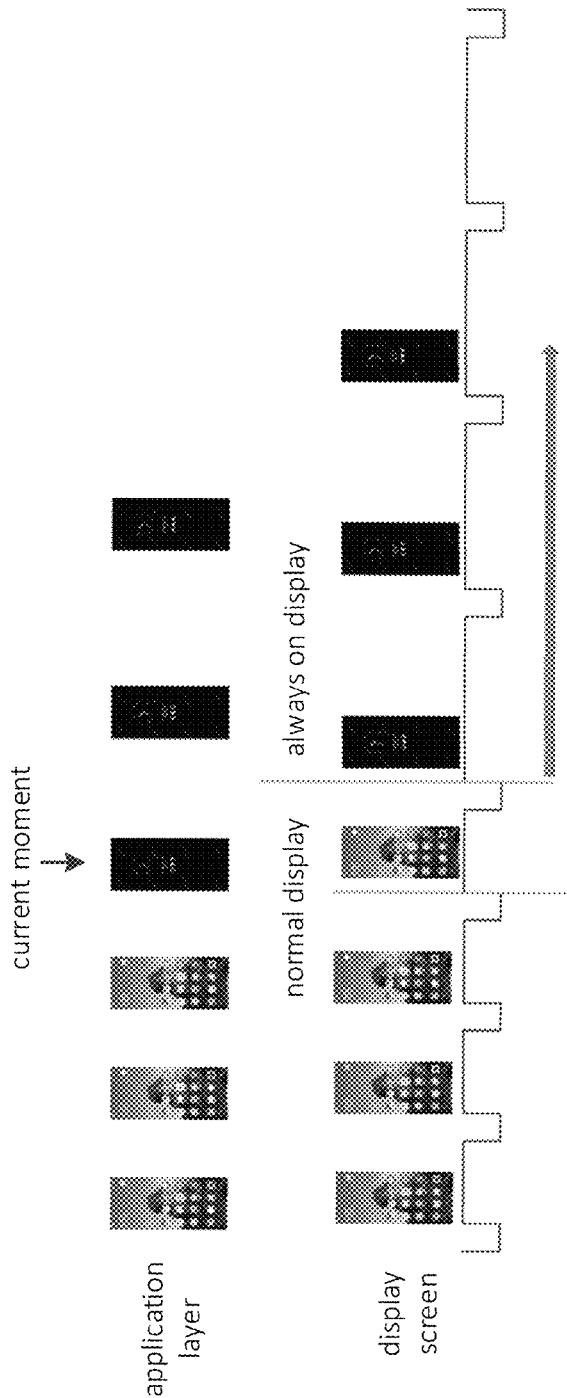
FIG. 4 is a schematic diagram illustrating an interface demonstration of a method for controlling a screen of the electronic device in accordance with an embodiment of the disclosure.

As an example, the execution subject of the method is the display chip in the electronic device, and the application scenario of the disclosure is illustrated as FIG. 4. After the display chip receives the switching instruction (which is also called AOD entering instruction) that is configured to control the display chip to switch to the AOD state sent by the application layer, the display chip can respond to the switching instruction and determine whether the display interface sent by the application layer at the current moment matches the switching instruction. For example, when the display interface received at the current moment is a normal operation interface (i.e., UI interface), which is called non-AOD interface herein, the display chip can display the non-AOD interface without switching its state and enter the waiting state until the display chip determines that the display interface sent by the application layer is an AOD interface. In other words, when the display interface matches the switching instruction, the state switching is performed, i.e., the display chip can switch to the AOD state to display the AOD interface.

As illustrated in FIG. 4, when the display interface received by the display chip from the application layer at a next moment of the current moment is an AOD interface, it can be determined that the display interface matches the switching instruction. In this case, the display chip can switch to the AOD state to display an AOD interface.

At block 305, in response to determining that the first display interface matches the switching instruction, the display chip switches to the AOD state based on the switching instruction to display the first display interface.

In some examples, when the first display interface matches the switching instruction, the display chip can switch to the AOD state based on the switching instruction. After the display chip is switched to the AOD state, the first display interface can be displayed, that is, an AOD interface is displayed.

With the method for controlling a screen of an electronic device in accordance with embodiments of the disclosure, in response to the switching instruction that is configured to the display chip to switch to the AOD state, it is determined whether the first display interface received from the application layer at the current moment is an AOD interface. When the display interface is an AOD interface, it is determined that the first display interface matches the switching instruction. When the first display interface is a non-AOD interface, it is determined that the first display interface does not match the switching instruction. Therefore, in the case that the switching instruction is configured to control the display chip to switch to the AOD state, it can be accurately determined whether the first display interface received from the application layer at the current moment matches the switching instruction, such that it can be ensured that the display chip can switch its state stably to avoid the flickering of the display screen.

Figure 5:
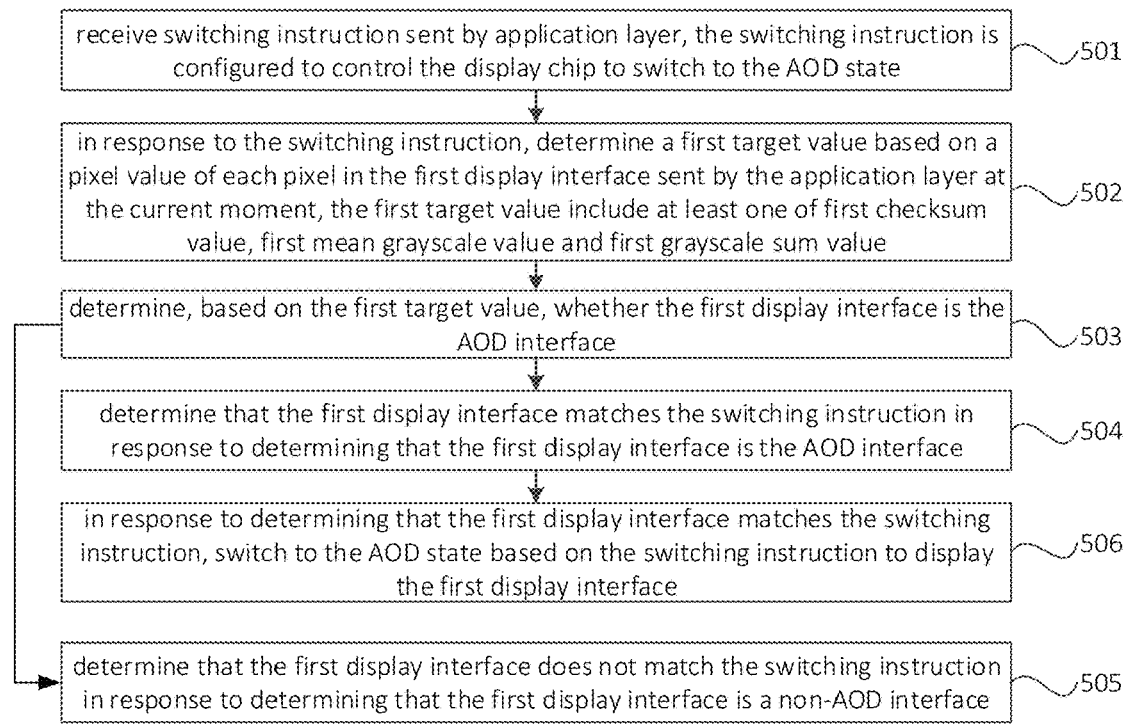
FIG. 5 is a flowchart illustrating a method for controlling a screen of an electronic device in accordance with another embodiment of the disclosure.

In the case that the switching instruction is configured to control the display chip to switch to an AOD state, in order to clearly explain how to determine whether the first display interface received from the application layer at the current moment is an AOD interface, the method for controlling a screen of the electronic device is also illustrated as FIG. 5.

FIG. 5 is a flowchart illustrating a method for controlling a screen of an electronic device in accordance with an embodiment of the disclosure. The execution subject of the method can be the display chip of the electronic device.

As illustrated in FIG. 5, the method may include the following.

At block 501, a switching instruction sent by an application layer is received. The switching instruction is configured to control the display chip to switch to an AOD state.

The execution process of the block 501 can see the above related descriptions, which is not described herein.

At block 502, in response to the switching instruction, a first target value is determined based on a pixel value of each pixel of the first display interface received from the application layer at the current moment. The first target value includes at least one of a first checksum value, the first mean grayscale value and a first grayscale sum value.

The first target value may be determined from the pixel value of each pixel of the first display interface. The first target value may include at least one of the first checksum value, the first mean grayscale value, and the first grayscale sum value.

A sum of the pixel values of pixels on first n rows (e.g., the first 100 rows) in the first display interface and/or a sum of the pixel values of pixels on last m rows (e.g., last 100 rows) in the first display interface can be determined as the first checksum value. The value of n and the value of m may be the same or different, which is not described herein.

A mean value of the pixel values of all pixels in the first display interface may be used as the first mean grayscale value.

A sum of the pixel values of all pixels in the first display interface may be used as the first grayscale sum value.

As an example, the first target value may be the first checksum value, or the first mean grayscale value, or the first grayscale sum value.

When the first target value is the first checksum value, if the first checksum value equals to 2, the first target value is 2.

As another example, the first target value may include any two of the first checksum value, the first mean grayscale value and the first grayscale sum value, or the first target value is a weighted sum value of any two of the first checksum value, the first mean grayscale value and the first grayscale sum value. That is, the first target value may be a weighted sum value of the first checksum value and the first mean grayscale value, a weighted sum value of the first checksum value and the first grayscale sum value, or a weighted sum value of the first mean grayscale value and the first grayscale sum value.

For example, in the case that the first target value is the weighted sum value of the first checksum value and the first mean grayscale value and a weighted sum formula is: v=0.8*a+0.2*b, where v represents the first target value, a represents the first checksum value, and b represents the first mean grayscale value; if the first checksum value is 2 and the first mean grayscale value is 3, the first target value equals 0.8*2+0.2*3=2.2.

As another example, the first target value may include all of the first checksum value, the first mean grayscale value and the first grayscale sum value, or the first target value is a weighted sum value of the first checksum value, the first mean grayscale value, and the first grayscale sum value.

For example, the first target value is the weighted sum value of the first checksum value, the first mean grayscale value, and the first grayscale sum value and the weighted sum formula is: v=0.6*a+0.2*b+0.2*c, where v represents the first target value, a represents the first checksum value, b represents the first mean grayscale value, and c represents the first grayscale sum value, if the first checksum value is 1, the first mean grayscale value is 3, and the first grayscale sum value is 50, the first target value equals 0.6*1+0.2*3+0.2*50=11.2.

In the case that the switching instruction is configured to control the display chip to switch to an AOD state, after receiving the switching instruction, the first target value can be determined according to the pixel value of each pixel of the first display interface that is received from the application layer at the current moment.

At block 503, it is determined whether the first display interface is an AOD interface based on the first target value.

In some examples, it may be determined whether the first display interface is an AOD interface according to the first target value.

It is to be explained that, in order to clearly illustrate how to determine whether the first display interface is an AOD interface based on the first target value, in a possible implementation, in response to determining that the first target value is less than a threshold, it can be determined that the first display interface is an AOD interface; and in response to determining that the first target value is greater than or equal to the threshold, it is determined that the first display interface is a non-AOD interface.

In some examples, a first corresponding threshold may be set for the first checksum value, a second corresponding threshold may be set for the first mean grayscale value and a third corresponding threshold may be set for the first grayscale sum value. The first, second and third corresponding thresholds may be preset, and the first, second and the third corresponding threshold may be the same or different.

The threshold can be set for the first target value based on at least one of the first corresponding threshold set for the first checksum value, the second corresponding threshold set for the first mean grayscale value, and the third corresponding threshold set for the first grayscale sum value.

In the case that the first target value is the first checksum sum, or the first mean grayscale value or the first grayscale sum value, the threshold set for the first target value can be the first corresponding threshold, or the second corresponding threshold or the third corresponding threshold correspondingly.

When the first target value is the first checksum value and the first corresponding threshold set for the first checksum value is 5, the threshold set for the first target value is 5.

As another example, when the first target value is a weighted mean value of any two of the first checksum value, the first mean grayscale value and the first grayscale sum threshold, the threshold corresponding to the first target value may be a weighted sum value of the corresponding thresholds.

For example, when the first target value is the weighted sum value of the first checksum value and the first grayscale sum value and the weighted sum formula is v=0.8*a+0.2*c, where v represents the first target value, a represents the first checksum value, and c represents the first grayscale sum value; the threshold set for the first target value can be determined by the following formula: v1=0.8*a1+0.2*c1, where v1 represents the threshold corresponding to the first target value, a1 represents the first corresponding threshold set for the first checksum value, and c1 represents the third corresponding threshold set for the first grayscale sum value.

If the first corresponding threshold set for the first checksum value is 3 and the third corresponding threshold set for the first grayscale sum value is 60, the threshold set for the first target value equals $0.8*3+0.2*60$, i.e., 14.4.

As another example, in the case that the first target value is a weighted sum value of the first checksum value, the first mean grayscale value and the first grayscale sum value, the threshold set for the first target value may be the weighted sum value of the first corresponding threshold set for the first checksum value, the second corresponding threshold set for the first mean grayscale value, and the third corresponding threshold set for the first grayscale sum value.

When the first target value is the weighted mean of the first checksum value, the first mean grayscale value and the first grayscale sum value and the weighted sum formula is: $v=0.6*a+0.2*b+0.2*c$, where v represents the first target value, a represents the first checksum value, b represents the first mean grayscale value, and c represents the first grayscale sum value, the threshold set for the first target value can be determined by the following formula: $v1=0.6*a1+0.2*b1+0.2*c1$, where v1 represents the threshold set for the first target value, a1 represents the first corresponding threshold set for the first checksum value, b1 represents the second corresponding threshold set for the first mean grayscale value, and c1 represents the third corresponding threshold set for the first grayscale sum value.

If the first corresponding threshold set for the first checksum value is 3, the second corresponding threshold set for the first mean grayscale value is 5, and the third corresponding threshold set for the first grayscale sum value is 60, the threshold set for the first target value equals $0.6*3+0.2*5+0.2*60$, i.e., 14.8.

In detail, when the first target value is less than the threshold, it can be determined that the first display interface is an AOD interface. Correspondingly, when the first target value is greater than or equal to the threshold, it can be determined that the first display interface is a non-AOD interface.

It is to be noted that, in the case that the first target value includes any two of the first checksum value, the first mean grayscale value and the first grayscale sum value, the first target value is not limited to be the above-mentioned weighted sum value in the disclosure. In practical use, any two of the first checksum value, the first mean grayscale value and the first grayscale sum value can be compared with the corresponding thresholds to determine whether the first display interface is an AOD interface. For example, when the any two of the first checksum value, the first mean grayscale value and the first grayscale sum value are both less than the corresponding thresholds, it can be determined that the first display interface is an AOD interface. When at least one of the any two of the first checksum value, the first mean grayscale value and the first grayscale sum value is greater than or equal to the corresponding threshold, it can be determined that the first display interface is a non-AOD interface.

For example, when the first target value includes the first checksum value and the first mean grayscale value, the first corresponding threshold set for the first checksum value equals 5 and the second corresponding threshold set for the first mean grayscale value equals 4.5. When the first checksum value equals 3 and the first mean grayscale value equals 2.8, since the first checksum value is smaller than the first corresponding threshold set for the first checksum value and the first mean grayscale value is smaller than the second corresponding threshold set for the first means grayscale value, it can be determined that the first display interface is an AOD interface. In response to determining that at least one of the first checksum value and the first mean grayscale value is greater than or equal to a corresponding threshold, for example when the first checksum value equals 3 and the first mean grayscale value equals 6, since the first checksum value is less than the first corresponding threshold set for the first checksum value and the first mean grayscale value is greater than the second corresponding threshold for the first mean grayscale value, it can be determined that the first display interface is a non-AOD interface.

It is to be noted that, in the case that the first target value includes all of the first checksum value, the first mean grayscale value, and the first grayscale sum value, the first target value is not limited to be the above-mentioned weighted sum value in the disclosure. In practical use, all of the first checksum value, the first mean grayscale value and the first grayscale sum value can be compared with corresponding thresholds to determine whether the first display interface is an AOD interface. For example, when each of the first checksum value, the first mean grayscale value and the first grayscale sum value is less than the corresponding threshold, it can be determined that the first display interface is an AOD interface. When at least one of the first checksum value, the first mean grayscale value and the first grayscale sum value is greater than or equal to a corresponding threshold, it can be determined that the first display interface is a non-AOD interface.

For example, when the first target value includes all of the first checksum value, the first mean grayscale value, and the first grayscale sum value, the first corresponding threshold set for the first checksum value equals 5, the second corresponding threshold set for the first mean grayscale value equals 4.5, the third corresponding threshold set for the first grayscale sum value equals 50. In the case that the first checksum value equals 3, the first mean grayscale value equals 2.8 and the first grayscale sum value equals 40, since the first checksum value is less than the first corresponding threshold set for the first checksum value, the first mean grayscale value is less than the second corresponding threshold set for the first mean grayscale value, and the first grayscale sum value is less than the third corresponding threshold set for the first grayscale sum value, it can be determined that the first display interface is an AOD interface. In response to determining that at least one of the first checksum value, the first mean grayscale value and the first grayscale sum value is greater than or equal to a corresponding threshold, for example the first grayscale sum value is 70, since the first grayscale sum value is greater than the third corresponding threshold set for the first grayscale sum value, it can be determined that the first display interface is a non-AOD interface.

In some embodiments, in response to determining that the first display interface is an AOD interface, the block 504 may be performed. In response to determining that the first display interface is a non-AOD interface, the block 505 may be performed.

At block 504, in the case that the first display interface is an AOD interface, it is determined that the first display interface matches the switching instruction.

At block 505, in the case that the first display interface is a non-AOD interface, it is determined that the first display interface does not match the switching instruction.

At block 506, in response to determining that the first display interface matches the switching instruction, the display chip switches to the AOD state based on the switching instruction to display the first display interface.

The execution process of the blocks 504 to 506 can see the above related descriptions, which is not described herein.

With the method for controlling a screen of an electronic device in accordance with embodiments of the disclosure, the first target value is determined according to the pixel value of each pixel of the first display interface in response to the switching instruction that is configured to control the display chip to switch to the AOD state. The first target value includes at least one of the first checksum value, the first mean grayscale value and the first grayscale sum value. Based on the first target value, it is determined whether the first display interface is an AOD interface. Therefore, when the switching instruction is configured to control the display chip to switch to the AOD state, the first target value can be accurately determined based on the pixel value of each pixel of the first display interface sent by the application layer at the current moment, to determine whether the first display interface is the AOD interface based on the first target value, to improve the stability of the state switching of the display chip.

In the case that the switching instruction is configured control the display chip to switch to the AOD state, in order to clearly explain how to determine whether the first display interface received from the application layer at the current moment is the AOD interface in the disclosure, there is further provided a method for controlling a screen of an electronic device.

Figure 6:
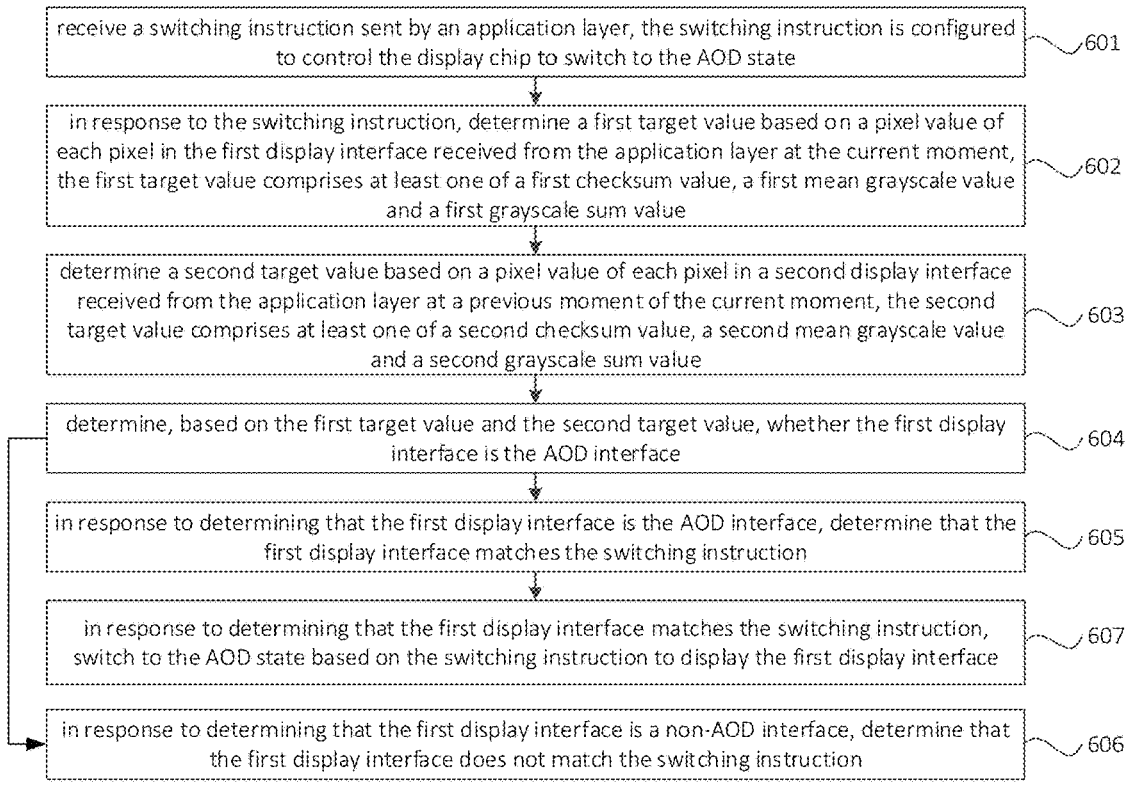
FIG. 6 is a flowchart illustrating a method for controlling a screen of an electronic device in accordance with another embodiment of the disclosure.

FIG. 6 is a flowchart illustrating a method for controlling a screen of an electronic device in accordance with an embodiment of the disclosure. The execution subject of the method can be the display chip of the electronic device.

As illustrated in FIG. 6, the method includes the following.

At block 601, a switching instruction sent by an application layer is received. The switching instruction is configured to control the display chip to switch to an AOD state.

The execution process of the block 601 can see the above related descriptions, which is not described herein.

At block 602, in response to the switching instruction, a first target value is determined based on the pixel value of each pixel of the first display interface received from the application layer at the current moment. The first target value includes at least one of the first checksum value, the first mean grayscale value and a first grayscale sum value.

The execution process of the block 602 can see the above related descriptions of the block 502, which is not described herein.

At block 603, a second target value is determined based on the pixel value of each pixel of a second display interface received from the application layer at a previous moment of the current moment. The second target value includes at least one of a second checksum value, a second grayscale value and a second grayscale sum value.

In some examples, the second target value may be determined by the pixel value of each pixel of the second display interface, and the second target value may include at least one of the second checksum value, the second mean grayscale value, and the second grayscale sum value.

The second target value may be determined based on the pixel value of each pixel of the second display interface received from the application layer at the previous moment of the current moment. The second target value corresponding to the second display interface may be determined in a manner similar to the determination of the first target value corresponding to the first display interface in the foregoing embodiment, and the implementation principle thereof is similar, which will not be repeated here.

At block 604, it is determined whether the first display interface is an AOD interface based on the first target value and the second target value.

It can be determined whether the first display interface is an AOD interface based on the first target value determined in the block 602 and the second target value determined in the block 603.

It is to be noted that, generally, the checksum value, the mean grayscale value and grayscale sum value corresponding to the AOD interface are relatively small, and the target value corresponding to the AOD interface is also relatively small; the checksum value, the mean grayscale value and the grayscale sum value corresponding to the non-AOD interface are relatively large, and the target value corresponding to the non-AOD interface is also relatively large. Based on this characteristic, it can be determined whether the first display interface is an AOD interface. That is, in a possible implementation, a difference between the first target value and the second target value can be determined and it may be determined whether the first display interface is an AOD interface based on the difference. For example, when the difference is greater than a preset threshold, it can be determined that the first display interface is an AOD interface. That is, in the case that the second target value is significantly greater than the first target value, it can be determined that the first display interface is an AOD interface. In the case that the difference is less than or equal to the preset threshold, it can be determined that the first display interface is a non-AOD interface.

In some examples, the value of the preset threshold value can be set in advance, for example, the preset threshold value may be 50.

The difference may be the difference between the first target value and the second target value, or an absolute value of the difference between the first target value and the second target value. Alternatively, the difference can be determined with other statistical algorithms, as long as the difference between the first target value and the second target value can be characterized.

For example, the preset threshold is 50. When the first target value determined based on the pixel value of each pixel of the first display interface is 5 and the second target value determined based on the pixel value of each pixel of the second display interface is 81, the difference between the first target value and the second target value is 76. Since the difference between the first target value and the second target value is greater than the preset threshold, it can be determined that the first display interface is an AOD interface. When the first target value determined based on the pixel value of each pixel of the first display interface is 66 and the second target value determined based on the pixel value of each pixel of the second display interface is 81, the difference between the first target value and the second target value is 15. Since the difference between the first target value and the second target value is less than the preset threshold, it can be determined that the first display interface is a non-AOD interface.

In some embodiments, when the first display interface is an AOD interface, the block 605 is performed. When the first display interface is a non-AOD interface, the block 606 is performed.

At block 605, in the case that the first display interface is an AOD interface, it is determined that the first display interface matches the switching instruction.

At block 606, in the case that the first display interface is a non-AOD interface, it is determined that the first display interface does not match the switching instruction.

At block 607, in response to determining that the first display interface matches the switching instruction, the display chip switches to an AOD state based on the switching instruction to display the first display interface.

The execution process of the blocks 605 to 607 can see the above related descriptions, which is not described herein.

With the method for controlling a screen of an electronic device in accordance with embodiments of the disclosure, in response to the switching instruction that is configured to control the display chip to switch to the AOD state, the first target value is determined based on the pixel value of each pixel of the first display interface received from the application layer at the current moment. The first target value includes at least one of the first checksum value, the first mean grayscale value and the first grayscale sum value. The second target value is determined based on the pixel value of each pixel of the second display interface received from the application layer at the previous moment of the current moment. The second target value includes at least one of the second checksum value, the second mean grayscale value and the second grayscale sum value. It is determined whether the first display interface is an AOD interface based on the first target value and the second target value. In this way, it is possible to accurately determine whether the first display interface received from the application layer at the current moment is the AOD interface based on the difference between the first target value of the first display interface received at the current moment and the second target value of the second display interface received at the previous moment of the current moment.

It is to be noted that, in the method for controlling a screen of an electronic device illustrated in FIG. 2 to FIG. 6 of the disclosure, in the case that the switching instruction is configured to control the display chip to switch to the AOD state, it is determined whether the first display interface received from the application layer at the current moment matches the switching instruction.

Correspondingly, in the case that the switching instruction is configured to control the display chip to switch to the non-AOD state, in order to clearly explain how to determine whether the first display interface received from the application layer at the current moment matches the switching instruction, a further method for controlling a screen of an electronic device is provided.

Figure 7:
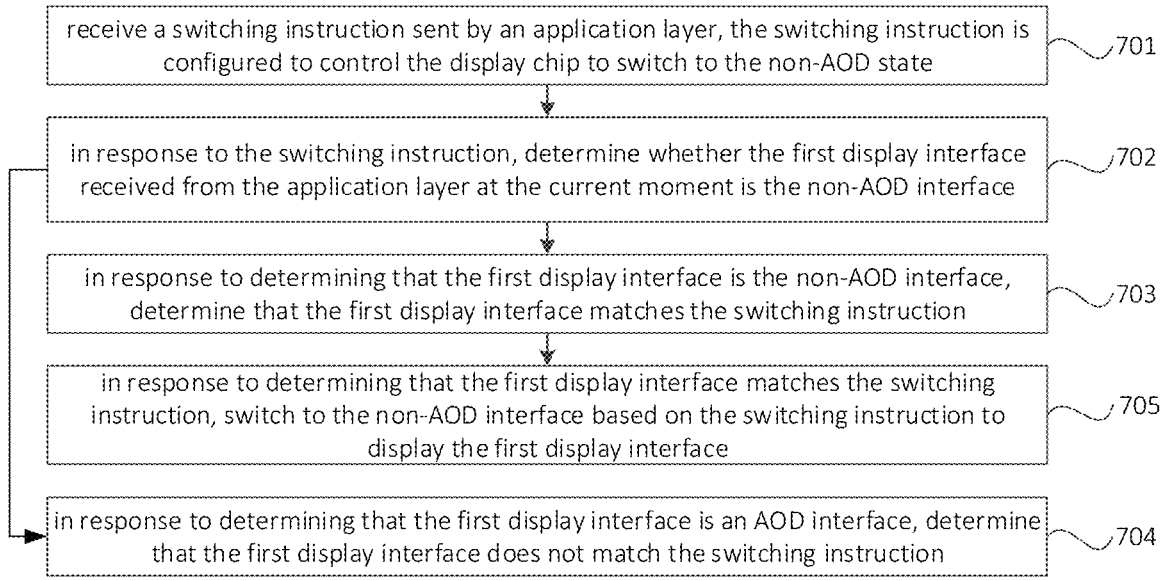
FIG. 7 is a flowchart illustrating a method for controlling a screen of an electronic device in accordance with another embodiment of the disclosure.

FIG. 7 is a flowchart illustrating a method for controlling a screen of an electronic device in accordance with an embodiment of the disclosure. The execution subject of the method can be the display chip of the electronic device.

As illustrated in FIG. 7, the method includes the following.

At block 701, a switching instruction sent by the application layer is received. The switching instruction is configured to control the display chip to switch to a non-AOD state.

In some examples, the electronic device may receive the switching instruction sent by the application layer.

The execution subject of the method is for example a display chip in the electronic device. The application layer can send the switching instruction to the display chip, and correspondingly, the display chip can receive the switching instruction sent by the application layer. The switching instruction can be used to control the display chip to switch to the non-AOD state.

At block 702, in response to the switching instruction, it is determined whether the first display interface received from the application layer at the current moment is a non-AOD interface.

In some examples, in the case that the switching instruction is configured to control the display chip to switch to the non-AOD state, after receiving the switching instruction, it can be determined whether the first display interface received from the application layer at the current moment is a non-AOD interface.

In some embodiments, in response to determining that the first display interface is a non-AOD interface, the block 703 is performed; in response to determining that the first display interface is an AOD interface, the block 704 is performed.

At block 703, in the case that the first display interface is a non-AOD interface, it is determined that the first display interface matches the switching instruction.

In some examples, when the switching instruction is used to control the display chip to switch to the non-AOD state and the first display interface received at the current moment is the non-AOD interface, it can be determined that the first display interface matches the switching instruction.

At block 704, in the case that the first display interface is an AOD interface, it is determined that the first display interface does not match the switching instruction.

In some examples, when the switching instruction is used to control the display chip to switch to the non-AOD state and the first display interface received at the current moment is an AOD interface, it can be determined that the first display interface does not match the switching instruction.

It is to be noted that, when the switching instruction is configured to control the display chip to switch to the non-AOD and the first display interface received at the current moment is the AOD interface, that is, the first display interface does not match the switching instruction, the display chip enters a waiting state and perform the block 702 and subsequent blocks again after receiving a new first display interface from the application layer at any time after the current moment.

At block 705, in response to determining that the first display interface matches the switching instruction, the display chip is switches to a non-AOD state based on the switching instruction to display the first display interface.

In some examples, when the first display interface matches the switching instruction, the display chip can switch to the non-AOD state. After the display chip is switched to the non-AOD state, the first display interface can be displayed, that is, a non-AOD interface is displayed.

With the method for controlling a screen of an electronic device in accordance with embodiments of the disclosure, in response to the switching instruction that is configured to the display chip to switch to the non-AOD state, it is determined whether the first display interface received from the application layer at the current moment is a non-AOD interface. When the display interface is a non-AOD interface, it is determined that the first display interface matches the switching instruction. When the first display interface is an AOD interface, it is determined that the first display interface does not match the switching instruction. Therefore, in the case that the switching instruction is configured to control the display chip to switch to the non-AOD state, it can be accurately determined whether the first display interface received from the application layer at the current moment matches the switching instruction, such that it can be ensured that the display chip can switch its state stably to avoid the flickering of the display screen, thereby improving user experience.

In the case that the switching instruction is configured to control the display chip to switch to the non-AOD state, in order to clearly explain how to determine whether the first display interface received from the application layer at the current moment is a non-AOD interface, a further method for controlling a screen of the electronic device is provided.

Figure 8:
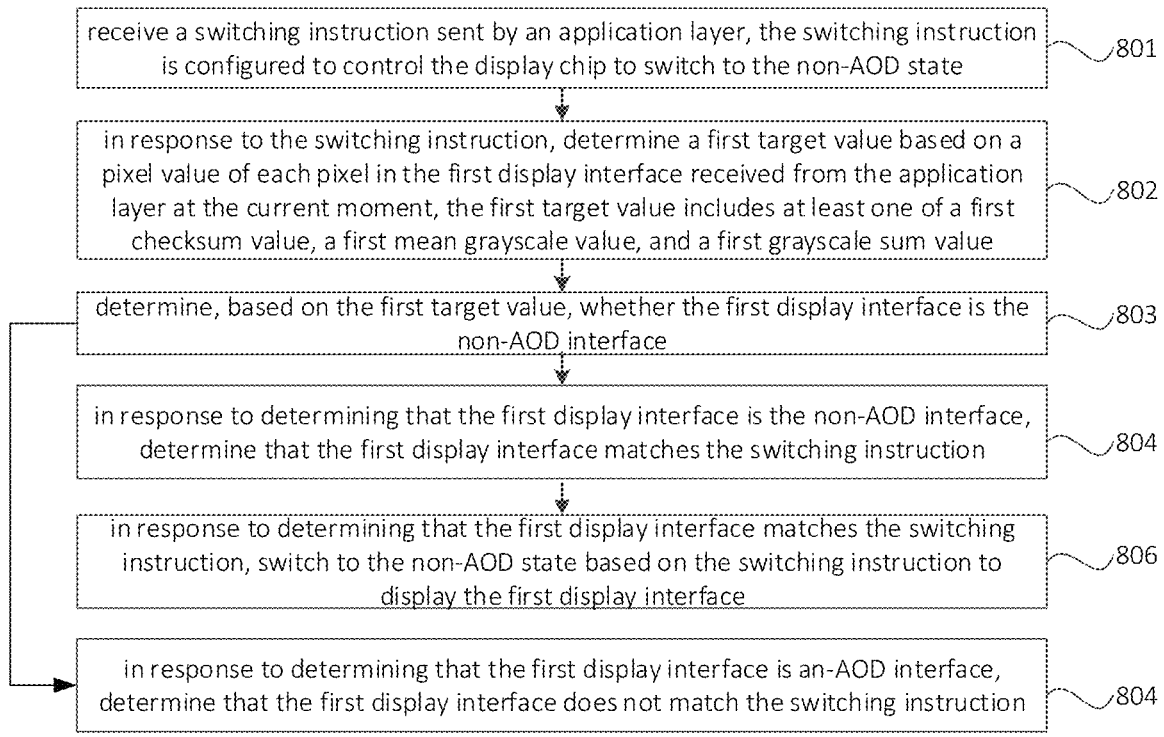
FIG. 8 is a flowchart illustrating a method for controlling a screen of an electronic device in accordance with another embodiment of the disclosure.

FIG. 8 is a flowchart illustrating a method for controlling a screen of an electronic device in accordance with an embodiment of the disclosure. The execution subject of the method can be the display chip of the electronic device.

As illustrated in FIG. 8, the method may include the following.

At block 801, a switching instruction sent by an application layer is received. The switching instruction is configured to control the display chip to switch to a non-AOD state.

The execution process of the block 801 can see the above related descriptions, which is not described herein.

At block 802, in response to the switching instruction, a first target value is determined based on a pixel value of each pixel of the first display interface received from the application layer at the current moment. The first target value includes at least one of a first checksum value, the first mean grayscale value and a first grayscale sum value.

When the switching instruction is configured to control the display chip to switch to the non-AOD state, the first target value is determined according to the pixel value of each pixel of the first display interface received from the application layer received at the current moment. The way of determining the first target value may refer to the block 502, which will not be repeated here.

At block 803, it is determined whether the first display interface is a non-AOD interface based on the first target value.

In some embodiments, it is determined whether the first display interface is a non-AOD interface based on the first target value.

The descriptions of determining whether the first display interface is a non-AOD interface based on the first target value can see the related descriptions of the block 503, which will not be repeated here.

In some embodiments, in response to determining that the first display interface is a non-AOD interface, the block 804 is performed; and in response to determining that the first display interface is an AOD interface, the block 805 is performed.

At block 804, in the case that the first display interface is a non-AOD interface, it is determined that the first display interface matches the switching instruction.

At block 805, in the case that the first display interface is an AOD interface, it is determined that the first display interface does not match the switching instruction.

At block 806, in response to determining that the first display interface matches the switching instruction, the display chip switches to the non-AOD state according to the switching instruction to display the first display interface.

The execution process of the blocks 804 to 806 can see the above related descriptions, which is not described herein.

With the method for controlling a screen of an electronic device in accordance with embodiments of the disclosure, the first target value is determined according to the pixel value of each pixel of the first display interface in response to the switching instruction that is configured to control the display chip to switch to the non-AOD state. The first target value includes at least one of the first checksum value, the first mean grayscale value and the first grayscale sum value. Based on the first target value, it is determined whether the first display interface is a non-AOD interface. Therefore, when the switching instruction is configured to control the display chip to switch to the non-AOD state, the first target value can be accurately determined based on the pixel value of each pixel of the first display interface sent by the application layer at the current moment, to determine whether the first display interface is the AOD interface based on the first target value, to improve the stability of the state switching of the display chip.

In the case that the switching instruction is configured to control the display chip to switch to the non-AOD state, in order to clearly explain how to determine whether the first display interface received from the application layer at the current moment is a non-AOD interface, a further method for controlling a screen of an electronic device is provided.

Figure 9:
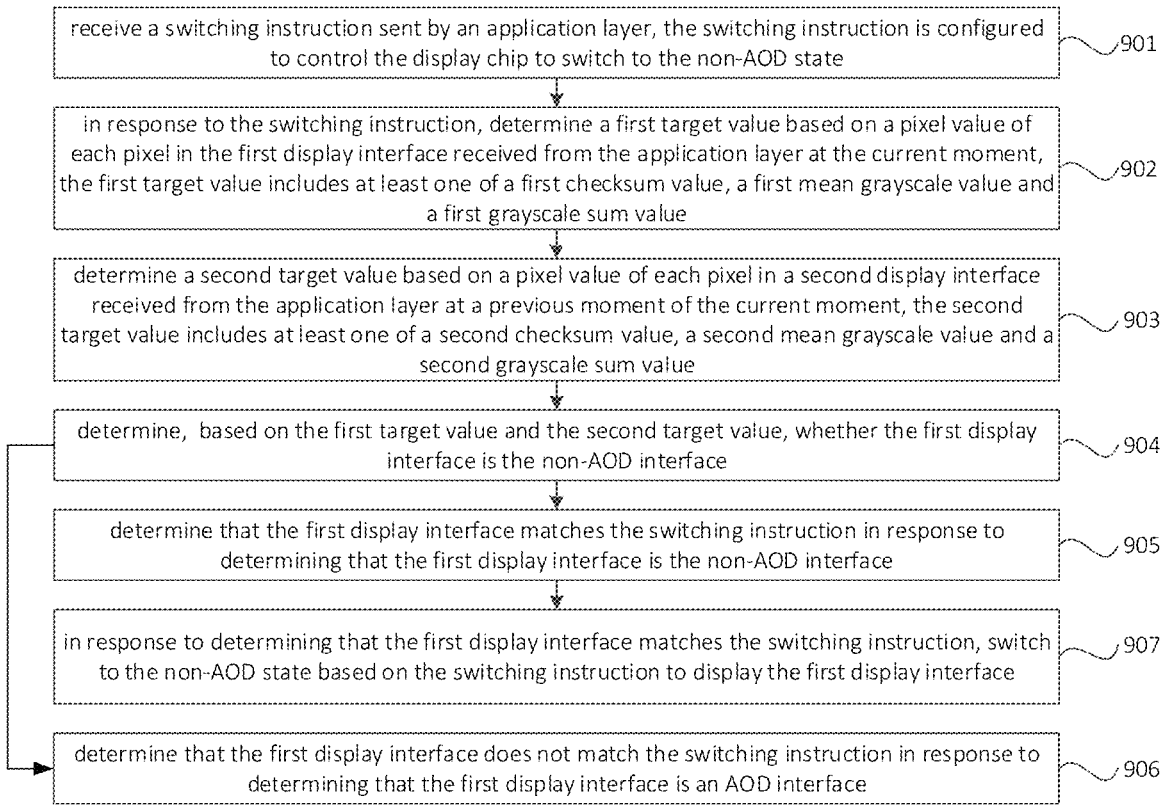
FIG. 9 is a flowchart illustrating a method for controlling a screen of an electronic device in accordance with another embodiment of the disclosure.

FIG. 9 is a flowchart illustrating a method for controlling a screen of an electronic device in accordance with an embodiment of the disclosure. The execution subject of the method can be the display chip of the electronic device.

As illustrated in FIG. 9, the method includes the following.

At block 901, a switching instruction sent by an application layer is received. The switching instruction is configured to control the display chip to switch to a non-AOD state.

The execution process of the block 901 can see the above related descriptions, which is not described herein.

At block 602, in response to the switching instruction, a first target value is determined based on the pixel value of each pixel of the first display interface received from the application layer at the current moment. The first target value includes at least one of the first checksum value, the first mean grayscale value and a first grayscale sum value.

The execution process of the block 902 can see the above related descriptions of the block 802, which is not described herein.

At block 903, a second target value is determined based on the pixel value of each pixel of a second display interface received from the application layer at a previous moment of the current moment. The second target value includes at least one of a second checksum value, a second grayscale value and a second grayscale sum value.

The execution process of the block 903 can see the above related descriptions of the block 603, which is not described herein.

At block 904, it is determined whether the first display interface is a non-AOD interface based on the first target value and the second target value.

It can be determined whether the first display interface is a non-AOD interface based on the first target value determined in the block 902 and the second target value determined in the block 903.

It is to be noted that, generally, the checksum value, the mean grayscale value and grayscale sum value corresponding to the AOD interface are relatively small, and the target value corresponding to the AOD interface is also relatively small; the checksum value, the mean grayscale value and the grayscale sum value corresponding to the non-AOD interface are relatively large, and the target value corresponding to the non-AOD interface is also relatively large. Based on this characteristic, it can be determined whether the first display interface is a non-AOD interface. That is, in a possible implementation, a difference between the first target value and the second target value can be determined and it may be determined whether the first display interface is a non-AOD interface based on the difference. For example, when the difference is greater than a preset threshold, it can be determined that the first display interface is a non-AOD interface. In the case that the difference is less than or equal to the preset threshold, it can be determined that the first display interface is an AOD interface.

In some examples, the value of the preset threshold value can be set in advance, for example, the preset threshold value may be 50.

The difference may be the difference between the first target value and the second target value, or an absolute value of the difference between the first target value and the second target value. Alternatively, the difference can be determined with other statistical algorithms, as long as the difference between the first target value and the second target value can be characterized.

For example, the preset threshold is 50. When the first target value determined based on the pixel value of each pixel of the first display interface is 81 and the second target value determined based on the pixel value of each pixel of the second display interface is 5, the difference between the first target value and the second target value is 76. Since the difference between the first target value and the second target value is greater than the preset threshold, it can be determined that the first display interface is a non-AOD interface. When the first target value determined based on the pixel value of each pixel of the first display interface is 35 and the second target value determined based on the pixel value of each pixel of the second display interface is 65, the difference between the first target value and the second target value is 30. Since the difference between the first target value and the second target value is less than the preset threshold, it can be determined that the first display interface is an AOD interface.

In some embodiments, when the first display interface is a non-AOD interface, the block 905 is performed. When the first display interface is an AOD interface, the block 906 is performed.

At block 905, in the case that the first display interface is a non-AOD interface, it is determined that the first display interface matches the switching instruction.

At block 906, in the case that the first display interface is an AOD interface, it is determined that the first display interface does not match the switching instruction.

At block 907, in response to determining that the first display interface matches the switching instruction, the display chip switches to the non-AOD state based on the switching instruction to display the first display interface.

The execution process of the blocks 905 to 907 can see the above related descriptions, which is not described herein.

With the method for controlling a screen of an electronic device in accordance with embodiments of the disclosure, in response to the switching instruction that is configured to control the display chip to switch to the non-AOD state, the first target value is determined based on the pixel value of each pixel of the first display interface received from the application layer at the current moment. The first target value includes at least one of the first checksum value, the first mean grayscale value and the first grayscale sum value. The second target value is determined based on the pixel value of each pixel of the second display interface received from the application layer at the previous moment of the current moment. The second target value includes at least one of the second checksum value, the second mean grayscale value and the second grayscale sum value. It is determined whether the first display interface is a non-AOD interface based on the first target value and the second target value. In this way, it is possible to accurately determine whether the first display interface received from the application layer at the current moment is the non-AOD interface based on the difference between the first target value of the first display interface received at the current moment and the second target value of the second display interface received at the previous moment of the current moment.

Corresponding to the method for controlling a screen of an electronic device illustrated in FIGS. 2 to 9, an apparatus for controlling a screen of an electronic device is also provided. Since the apparatus corresponds to the method according to embodiments related to FIG. 2 to FIG. 9, descriptions of the method are also applicable to the apparatus, which are not repeated herein.

Figure 10:
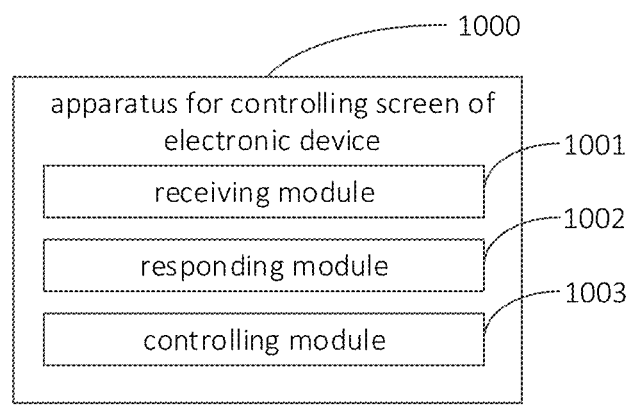
FIG. 10 is a schematic diagram illustrating a device for controlling a screen of an electronic device in accordance with an embodiment of the disclosure.

FIG. 10 is a schematic diagram illustrating an apparatus for controlling a screen of an electronic device in accordance with an embodiment of the disclosure.

As illustrated in FIG. 10, the apparatus 1000 includes: a receiving module 1001, a responding module 1002, and a controlling module 1003.

The receiving module 1001 is configured to receive a switching instruction sent by the application layer. The switching instruction is configured to control the display chip to switch between an AOD state and a non-AOD state.

The responding module 1002 is configured to, in response to the switching instruction, determine whether the first display interface received from the application layer at the current moment matches the switching instruction.

The controlling module 1003 is configured to control the display chip to switch the state to display the first display interface based on the switching instruction in response to determining that the first display interface matches the switching instruction.

In a possible implementation, in the case that the switching instruction is configured to control the display chip to switch to the AOD state, the responding module 1002 is configured to, in response to the switching instruction that is configured to control the display chip to switch to the AOD state, determine whether the first display interface received from the application layer received at the current moment is an AOD interface; in response to determining that the first display interface is an AOD interface, determine that the first display interface matches the switching instruction; in response to determining that the first display interface is a non-AOD interface, determine that the first display interface does not match the switching instruction.

In a possible implementation, in the case that the switching instruction is configured to control the display chip to switch to the AOD state, the responding module 1002 is configured to, determine a first target value based on a pixel value of each pixel of the first display interface, where the first target value includes at least one of a first checksum value, a first mean grayscale value and a first grayscale sum value; and determine whether the first display interface is an AOD interface based on the first target value.

In a possible implementation, in the case that the switching instruction is configured to control the display chip to switch to the AOD state, the responding module 1002 is configured to, in response to the first target value is less than a threshold, determine that the first display interface is an AOD interface; in response to determining that the first target value is greater than or equal to the threshold, determine that the first display interface is a non-AOD interface.

In a possible implementation, in the case where the switching instruction is configured to control the display chip to switch to the AOD state, the responding module 1002 is configured to determine a first target value based on a pixel value of each pixel of the first display interface, where the first target value includes at least one of a first checksum value, a first mean grayscale value and a first grayscale sum value; determine a second target value based on a pixel value of each pixel of a second display interface received from the application layer at a previous moment of the current moment, where the second target value includes a second checksum value, a second mean grayscale value and a second grayscale sum value; and determine whether the first display interface is an AOD interface based on the first target value and the second target value.

In a possible implementation, in the case that the display chip controlled by the switching instruction is configured to control the display chip to switch to the AOD state, the responding module 1002 is configured to determine a difference between the first target value and the second target value; in response to determining that the difference is greater than a preset threshold, determine that the first display interface is an AOD interface; in response to determining that the difference is less than or equal to the preset threshold, determine that the first display interface is a non-AOD interface.

In a possible implementation manner, in the case that the switching instruction is configured to control the display chip to switch to a non-AOD state, the responding module 1002 is configured to, in response to the switching instruction that is configured to control the display chip to switch to the non-AOD state, determine whether the first display interface received from the application layer the current moment is a non-AOD interface; in response to determining that the first display interface is a non-AOD interface, determine that the first display interface matches the switching instruction; in response to determining that the first display interface is an AOD interface, determine that the first display interface does not match the switching instruction.

In a possible implementation, in the case that the switching instruction is configured to control the display chip to switch to the non-AOD state, the responding module 1002 is specifically configured to determine a first target value based on a pixel value of each pixel of the first display interface value, where the first target value includes at least one of a first checksum value, a first mean grayscale value and a first grayscale sum value; and determine whether the first display interface is a non-AOD interface based on the first target value.

In a possible implementation, in the case that the switching instruction is configured to control the display chip to switch to the non-AOD state, the responding module 1002 is configured to determine a first target value based on the pixel value of each pixel of the first display interface, where the first target value includes at least one of a first checksum value, a first mean grayscale value and a first grayscale sum value; determine a second target value based on a pixel value of each pixel of a second display interface received from the application layer at a previous moment of the current moment, where the second target value includes at least one of a second checksum value, a second mean grayscale value and a second grayscale sum value; and determine whether the first display interface is a non-AOD interface based on the first target value and the second target value.

With the apparatus for controlling a screen of an electronic device in accordance with an embodiment of the disclosure, the switching instruction sent by the application layer is received. The switching instruction is configured to control the display chip to switch between the AOD state and the non-AOD state. In response to the switching instruction, it is determined whether the first display interface received from the application layer at the current moment matches the switching instruction. In response to determining that the first display interface matches the switching instruction, the display chip is controlled to switch according to the switching instruction to display the first display interface. Therefore, when the display interface issued by the application layer matches the switching instruction, the display chip is controlled to perform state switching according to the switching instruction, and the display interface is displayed after the display chip performs the state switching, which can avoid that the display screen flickers when the display interface is controlled to perform the state switching in case that the display interface does not match the switching instruction. Therefore, the user experience is improved.

In order to realize the above-mentioned embodiments, the disclosure also provides an electronic device. The electronic device includes a memory, a processor, and a computer program stored in the memory and running on the processor. When the processor executes the program, the method for controlling a screen of an electronic device in accordance with embodiments of the disclosure is disclosed.

In order to realize the above-mentioned embodiments, the disclosure also provides a non-transitory computer-readable storage medium on which a computer program is stored. When the program is executed by a processor, the method for controlling a screen of an electronic device in accordance with embodiments of the disclosure is performed.

In order to realize the above embodiments, the disclosure further provides a computer program product. When the instructions in the computer program product are executed by the processor, the method for controlling a screen of an electronic device in accordance with embodiments of the disclosure is performed.

Figure 11:
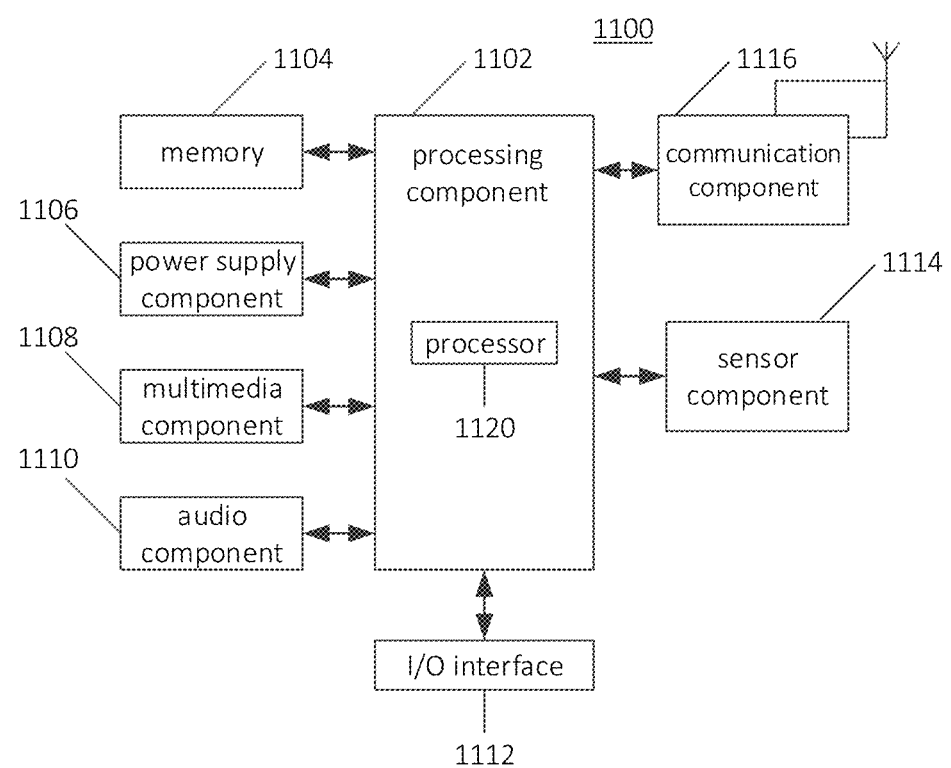
FIG. 11 is a block diagram illustrating an electronic device suitable for implementing embodiments of the disclosure.

FIG. 11 is a block diagram illustrating an electronic device in accordance with an embodiment of the disclosure. For example, the electronic device 1100 may be a mobile phone, a computer, a digital broadcast terminal, a messaging device, a game console, a tablet device, a medical device, a fitness device, a personal digital assistant, and the like.

As illustrated in FIG. 11, the electronic device 1100 may include one or more of the following components: a processing component 1102, a memory 1104, a power supply component 1106, a multimedia component 1108, an audio component 1110, an input/output (I/O) interface 1112, a sensor assembly 1114, and communication component 1116.

The processing component 1102 generally controls the overall operation of the electronic device 1100, such as operations associated with display, phone calls, data communications, camera operations, and recording operations. The processing component 1102 can include one or more processors 1120 to execute instructions to perform all or some of the steps of the methods described above. Additionally, processing component 1102 may include one or more modules that facilitate interaction between the processing component 1102 and other components. For example, the processing component 1102 may include a multimedia module to facilitate interaction between the multimedia component 1108 and the processing component 1102.

The memory 1104 is configured to store various types of data to support operation at the electronic device 1100. Examples of such data include instructions for any application or method operating on the electronic device 1100, contact data, phonebook data, messages, pictures, videos, and the like. The memory 1104 may be implemented by any type of volatile or nonvolatile storage device or combination thereof, such as static random access memory (SRAM), electrically erasable programmable read only memory (EE-PROM), erasable programmable read only memory (EPROM), programmable read only memory (PROM), read only memory (ROM), magnetic memory, flash memory, magnetic disk or optical disk.

The power supply component 1106 provides power to various components of electronic device 1100. The power supply component 1106 may include a power management system, one or more power sources, and other components associated with generating, managing, and distributing power to electronic device 1100s.

The multimedia component 1108 includes a screen that provides an output interface between the electronic device 1100 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 1108 includes a front-facing camera and/or a rear-facing camera. When the electronic device 1100 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 1110 is configured to output and/or input audio signals. For example, the audio component 1110 includes a microphone (MIC) that is configured to receive external audio signals when the electronic device 1100 is in operating modes, such as calling mode, recording mode, and voice recognition mode. The received audio signal may be further stored in the memory 1104 or transmitted via the communication component 1116. In some embodiments, the audio component 1110 also includes a speaker for outputting audio signals.

The I/O interface 1112 provides an interface between the processing component 1102 and a peripheral interface module, which may be a keyboard, a click wheel, a button, or the like. These buttons may include, but are not limited to: home button, volume buttons, start button, and lock button.

The sensor assembly 1114 includes one or more sensors for providing various aspects of status assessment for the electronic device 1100. For example, the sensor assembly 1114 can detect the open/closed state of the electronic device 1100, the relative positioning of the components, such as the display and the keypad of the electronic device 1100. The sensor assembly 1114 can also detect changes in positions of the electronic device 1100 or components of the electronic device 1100, presence or absence of user contact with the electronic device 1100, orientation or acceleration/deceleration of the electronic device 1100 and changes in the temperature of the electronic device 1100. The sensor assembly 1114 may include a proximity sensor configured to detect the presence of nearby objects in the absence of any physical contact. The sensor assembly 1114 may also include a light sensor, such as a CMOS or CCD image sensor, for use in imaging applications. In some embodiments, the sensor assembly 1114 may also include an acceleration sensor, a gyroscope sensor, a magnetic sensor, a pressure sensor, or a temperature sensor.

The communication component 1116 is configured to facilitate wired or wireless communication between the electronic device 1100 and other devices. The electronic device 1100 may access wireless networks based on communication standards, such as WiFi, 4G or 5G, or a combination thereof. In an embodiment, the communication component 1116 receives broadcast signals or broadcast related information from an external broadcast management system via a broadcast channel. In an embodiment, the communication component 1116 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the electronic device 1100 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic components, to perform the above method.

In an embodiment, a non-transitory computer-readable storage medium including instructions, such as a memory 1104 including instructions, executable by the processor 1120 of the electronic device 1100 to perform the method described above is also provided. For example, the non-transitory computer-readable storage medium may be ROM, random access memory (RAM), CD-ROM, magnetic tape, floppy disk, optical data storage device, and the like.

In some implementations, the method for controlling a screen of an electronic device includes receiving a switching instruction sent by an application layer, in which the switching instruction is configured to control a display chip to switch between an always on display (AOD) state and a non-AOD state; in response to the switching instruction, determining whether a first display interface received from the application layer at a current moment matches the switching instruction; and in response to determining that the first display interface matches the switching instruction, controlling the display chip to switch between the AOD state and the non-AOD state based on the switching instruction to display the first display interface.

In some implementations, determining whether the first display interface received from the application layer at the current moment matches the switching instruction in response to the switching instruction includes in response to the switching instruction that is configured to control the display chip to switch to the AOD state, determining whether the first display interface received from the application layer at the current moment is an AOD interface; in response to determining that the first display interface is the AOD interface, determining that the first display interface matches the switching instruction; and in response to determining that the first display interface is a non-AOD interface, determining that the first display interface does not match the switching instruction.

In some implementations, determining whether the first display interface received from the application layer at the current moment is the AOD interface includes determining a first target value based on a pixel value of each pixel of the first display interface, in which the first target value includes at least one of a first checksum value, a first mean grayscale value and a first grayscale sum value; and determining whether the first display interface is an AOD interface based on the first target value.

In some implementations, determining whether the first display interface is the AOD interface based on the first target value includes in response to determining that the first target value is less than a threshold, determining that the first display interface is the AOD interface; and in response to determining that the first target value is greater than or equal to the threshold, determining that the first display interface is a non-AOD interface.

In some implementations, determining whether the first display interface received from the application layer at the current moment is the AOD interface includes determining a first target value based on a pixel value of each pixel of the first display interface, in which the first target value includes at least one of a first checksum value, a first mean grayscale value and a first grayscale sum value; determining a second target value based on a pixel value of each pixel of a second display interface received from at a previous moment of the current moment, in which the second target value includes at least one of a second checksum value, a second mean grayscale value and a first grayscale sum value; and determining whether the first display interface is the AOD interface based on the first target value and the second target value.

In some implementations, determining whether the first display interface is the AOD interface based on the first target value and the second target value includes determining a difference between the first target value and the second target value; in response to determining that the difference is greater than a preset threshold, determining that the first display interface is the AOD interface; and in response to determining that the difference is less than or equal to the preset threshold, determining that the first display interface is the non-AOD interface.

In some implementations, determining whether the first display interface received from the application layer at the current moment matches the switching instruction based on the switching instruction includes in response to the switching instruction that is configured to control the display chip to switch to the non-AOD state, determining whether a first display interface received from the application layer at a current moment is a non-AOD interface; in response to determining that the first display interface is the non-AOD interface, determining that the first display interface matches the switching instruction; and in response to determining that the first display interface is an AOD interface, determining that the first display interface does not match the switching instruction.

In some implementations, determining whether the first display interface received from the application layer at the current moment is the non-AOD interface includes determining a first target value based on a pixel value of each pixel of the first display interface, in which the first target value includes at least one of a first checksum value, a first mean grayscale value and a first grayscale sum value; and determining whether the first display interface is the non-AOD interface based on the first target value.

In some implementations, determining whether the first display interface received from the application layer at the current moment is the non-AOD interface includes determining a first target value based on a pixel value of each pixel of the first display interface, in which the first target value includes at least one of a first checksum value, a first mean grayscale value and a first grayscale sum value; determining a second target value based on a pixel value of each pixel of a second display interface received from at a previous moment of the current moment, in which the second target value includes at least one of a second checksum value, a second mean grayscale value and a first grayscale sum value; and determining whether the first display interface is the non-AOD interface based on the first target value and the second target value.

In the description of this specification, description with reference to the terms "one embodiment," "some embodiments," "example," "specific example," or "some examples", etc., mean specific features described in connection with the embodiment or example, structures, materials, or features are included in at least one embodiment or example of the disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine and combine the different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the description of the disclosure, "plurality" means at least two, such as two, three, etc., unless expressly and specifically defined otherwise.

Any description of a process or method in the flowcharts or otherwise described herein may be understood to represent a module, segment or portion of code including one or more executable instructions for implementing custom logical functions or steps of the process, and the scope of the preferred embodiments of the disclosure includes alternative implementations in which the functions may be performed out of the order shown or discussed, including performing the functions substantially concurrently or in the reverse order depending upon the functions involved, which should. It is understood by those skilled in the art to which the embodiments of the disclosure pertain.

The logic and/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from an instruction execution system, apparatus, or apparatus) or equipment. For the purposes of this specification, a "computer-readable medium" can be any device that can contain, store, communicate, propagate, or transport the program for use by or in conjunction with an instruction execution system, apparatus, or apparatus. More specific examples (non-exhaustive list) of computer readable media include the following: electrical connections with one or more wiring (electronic devices), portable computer disk cartridges (magnetic devices), random access memory (RAM), read only memory (ROM), erasable editable read only memory (EPROM or Flash Memory), fiber optic devices, and portable compact disc read only memory (CDROM). In addition, the computer readable medium may even be paper or other suitable medium on which the program may be printed, as the paper or other medium may be optically scanned, for example, followed by editing, interpretation, or other suitable medium as necessary process to obtain the program electronically and then store it in computer memory.

It should be understood that portions of the disclosure may be implemented in hardware, software, firmware, or a combination thereof. In the above-described embodiments, various steps or methods may be implemented in software or firmware stored in memory and executed by a suitable instruction execution system. For example, if implemented in hardware, as in another embodiment, it can be implemented by any one of the following techniques known in the art, or a combination thereof: discrete with logic gates for implementing logic functions on data signals logic circuits, ASICs with suitable combinational logic gates, programmable fate arrays (PGA), field programmable gate arrays (FPGA), etc.

Those of ordinary skill in the art can understand that all or part of the steps carried by the methods of the above embodiments can be completed by instructing the relevant hardware through a program, and the program can be stored in a computer-readable storage medium, and the program is stored in a computer-readable storage medium. When executed, one or a combination of the steps of the method embodiment is included.

In addition, each functional unit in each embodiment of the disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, they may also be stored in a computer-readable storage medium.

The above-mentioned storage medium may be a read-only memory, a magnetic disk or an optical disk, and the like. Although the embodiments of the disclosure have been shown and described above, it should be understood that the above-mentioned embodiments are exemplary and should not be construed as limiting the present disclosure. Embodiments are subject to variations, modifications, substitutions and variations.

What is claimed is:

1. A method for controlling a screen of an electronic device, comprising:
   receiving a switching instruction sent by an application layer, wherein the switching instruction is configured to control a display chip to switch between an always on display (AOD) state and a non-AOD state;
   in response to the switching instruction, determining whether a first display interface received from the application layer at a current moment matches the switching instruction; and
   in response to determining that the first display interface matches the switching instruction, switching between the AOD state and the non-AOD state based on the switching instruction to display the first display interface;
   wherein in response to the switching instruction, determining whether the first display interface received from the application layer at a current moment matches the switching instruction comprises:
   in response to the switching instruction that is configured to control the display chip to switch to the AOD state, determining whether the first display interface received from the application layer at the current moment is an AOD interface;
   in response to determining that the first display interface is the AOD interface, determining that the first display interface matches the switching instruction; and
   in response to determining that the first display interface is a non-AOD interface, determining that the first display interface does not match the switching instruction.

2. The method of claim 1, further comprising:
   in response to determining, based on the first display interface being the non-AOD interface, that the first display interface does not match the switching instruction, entering a waiting state and determining whether a next first display interface received from the application layer after the current moment is the AOD interface in response to receiving the next first display interface.

3. The method of claim 1, wherein determining whether the first display interface received from the application layer at the current moment is the AOD interface comprises:
   determining a first target value based on a pixel value of each pixel of the first display interface, wherein the first target value comprises at least one of a first checksum value, a first mean grayscale value and a first grayscale sum value;
   in response to determining that the first target value is less than a threshold, determining that the first display interface is the AOD interface; and
   in response to determining that the first target value is greater than or equal to the threshold, determining that the first display interface is the non-AOD interface.

4. The method of claim 1, wherein determining whether the first display interface received from the application layer at the current moment is the AOD interface comprises:
   determining a first target value based on a pixel value of each pixel of the first display interface, wherein the first target value comprises at least one of a first checksum value, a first mean grayscale value and a first grayscale sum value;
   determining a second target value based on a pixel value of each pixel of a second display interface received from at a previous moment of the current moment, wherein the second target value comprises at least one of a second checksum value, a second mean grayscale value and a first grayscale sum value; and
   determining, based on the first target value and the second target value, whether the first display interface is the AOD interface.

5. The method of claim 4, wherein determining, based on the first target value and the second target value, whether the first display interface is the AOD interface comprises:
   determining a difference between the first target value and the second target value;
   in response to determining that the difference is greater than a preset threshold, determining that the first display interface is the AOD interface; and
   in response to determining that the difference is less than or equal to the preset threshold, determining that the first display interface is the non-AOD interface.

6. The method of claim 1, wherein determining, based on the switching instruction, whether the first display interface received from the application layer at the current moment matches the switching instruction comprises:
   in response to the switching instruction that is configured to control the display chip to switch to the non-AOD state, determining whether the first display interface received from the application layer at the current moment is the non-AOD interface;
   in response to determining that the first display interface is the non-AOD interface, determining that the first display interface matches the switching instruction; and in response to determining that the first display interface is the AOD interface, determining that the first display interface does not match the switching instruction.

7. The method of claim 6, wherein determining whether the first display interface received from the application layer at the current moment is the non-AOD interface comprises:
   determining a first target value based on a pixel value of each pixel of the first display interface, wherein the first target value comprises at least one of a first checksum value, a first mean grayscale value and a first grayscale sum value; and
   determining, based on the first target value, whether the first display interface is the non-AOD interface.

8. The method of claim 6, wherein determining whether the first display interface received from the application layer at the current moment is the non-AOD interface comprises:
   determining a first target value based on a pixel value of each pixel of the first display interface, wherein the first target value comprises at least one of a first checksum value, a first mean grayscale value and a first grayscale sum value;
   determining a second target value based on a pixel value of each pixel of a second display interface received from at a previous moment of the current moment, wherein the second target value comprises at least one of a second checksum value, a second mean grayscale value and a first grayscale sum value; and
   determining, based on the first target value and the second target value, whether the first display interface is the non-AOD interface.

9. An electronic device, comprising:
   a processor;
   a memory, for storing instructions executable by the processor; and
   a display chip;
   wherein, the display chip is configured to:
   receive a switching instruction sent by an application layer, wherein the switching instruction is configured to control a display chip to switch between an always on display (AOD) state and a non-AOD state;
   in response to the switching instruction, determine whether a first display interface received from the application layer at a current moment matches the switching instruction; and
   in response to determining that the first display interface matches the switching instruction, switch between the AOD state and the non-AOD state based on the switching instruction to display the first display interface;
   wherein the display chip is further configured to:
   in response to the switching instruction that is configured to control the display chip to switch to the AOD state, determine whether the first display interface received from the application layer at the current moment is an AOD interface;
   in response to determining that the first display interface is the AOD interface, determine that the first display interface matches the switching instruction; and
   in response to determining that the first display interface is a non-AOD interface, determine that the first display interface does not match the switching instruction.

10. The electronic device of claim 9, wherein the display chip is further configured to:
    in response to determining, based on the first display interface being the non-AOD interface, that the first display interface does not match the switching instruction, enter a waiting state and determine whether a next first display interface received from the application layer after the current moment is the AOD interface in response to receiving the next first display interface.

11. The electronic device of claim 9, wherein the display chip is further configured to:
    determine a first target value based on a pixel value of each pixel of the first display interface, wherein the first target value comprises at least one of a first checksum value, a first mean grayscale value and a first grayscale sum value;
    in response to determining that the first target value is less than a threshold, determine that the first display interface is the AOD interface; and
    in response to determining that the first target value is greater than or equal to the threshold, determine that the first display interface is the non-AOD interface.

12. The electronic device of claim 9, wherein the display chip is configured to:
    determine a first target value based on a pixel value of each pixel of the first display interface, wherein the first target value comprises at least one of a first checksum value, a first mean grayscale value and a first grayscale sum value;
    determine a second target value based on a pixel value of each pixel of a second display interface received from at a previous moment of the current moment, wherein the second target value comprises at least one of a second checksum value, a second mean grayscale value and a first grayscale sum value; and
    determine, based on the first target value and the second target value whether the first display interface is the AOD interface.

13. The electronic device of claim 12, wherein the display chip is configured to:
    determine a difference between the first target value and the second target value;
    in response to determining that the difference is greater than a preset threshold, determine that the first display interface is the AOD interface; and
    in response to determining that the difference is less than or equal to the preset threshold, determine that the first display interface is the non-AOD interface.

14. The electronic device of claim 9, wherein the display chip is configured to:
    in response to the switching instruction that is configured to control the display chip to switch to the non-AOD state, determine whether the first display interface received from the application layer at the current moment is the non-AOD interface;
    in response to determining that the first display interface is the non-AOD interface, determine that the first display interface matches the switching instruction; and
    in response to determining that the first display interface is the AOD interface, determine that the first display interface does not match the switching instruction.

15. The electronic device of claim 14, wherein the display chip is configured to:
    determine a first target value based on a pixel value of each pixel of the first display interface, wherein the first target value comprises at least one of a first checksum value, a first mean grayscale value and a first grayscale sum value; and
    determine, based on the first target value, whether the first display interface is the non-AOD interface.

16. The electronic device of claim 15, wherein the display chip is configured to:
    determine a first target value based on a pixel value of each pixel of the first display interface, wherein the first target value comprises at least one of a first checksum value, a first mean grayscale value and a first grayscale sum value;
determine a second target value based on a pixel value of each pixel of a second display interface received from at a previous moment of the current moment, wherein the second target value comprises at least one of a second checksum value, a second mean grayscale value and a first grayscale sum value; and
determine, based on the first target value and the second target value, whether the first display interface is the non-AOD interface.

17. A non-transitory computer-readable storage medium having instructions stored thereon that, when executed by a display chip of an electronic device, control the display chip to:
receive a switching instruction sent by an application layer, wherein the switching instruction is configured to control a display chip to switch between an always on display (AOD) state and a non-AOD state;
in response to the switching instruction, determine whether a first display interface received from the application layer at a current moment matches the switching instruction; and in response to determining that the first display interface matches the switching instruction, switch between the AOD state and the non-AOD state based on the switching instruction to display the first display interface;
in response to the switching instruction, determine whether the first display interface received from the application layer at a current moment matches the switching instruction, the display chip is controlled to:
in response to the switching instruction that is configured to control the display chip to switch to the AOD state, determine whether the first display interface received from the application layer at the current moment is an AOD interface;
in response to determining that the first display interface is the AOD interface, determine that the first display interface matches the switching instruction; and
in response to determining that the first display interface is a non-AOD interface, determine that the first display interface does not match the switching instruction.

* * * * *